United States Patent
Devor et al.

(10) Patent No.: US 11,836,627 B2
(45) Date of Patent: *Dec. 5, 2023

(54) TRAINING A MACHINE TO RECOGNIZE A MOTOR VEHICLE DRIVER USING A MOBILE DEVICE

(71) Applicant: REDFLEX TRAFFIC SYSTEMS PTY LTD, South Melbourne (AU)

(72) Inventors: Jonathan Devor, Jerusalem (IL); Moshe Mikhael Frolov, Jerusalem (IL); Igal Muchnik, Mevaseret Tzion (IL); Herbert Zlotogorski, Jerusalem (IL)

(73) Assignee: REDFLEX TRAFFIC SYSTEMS PTY LTD, South Melbourne (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/055,028

(22) Filed: Nov. 14, 2022

(65) Prior Publication Data

US 2023/0206064 A1 Jun. 29, 2023

Related U.S. Application Data

(63) Continuation of application No. 16/907,245, filed on Jun. 21, 2020, now Pat. No. 11,527,083.

(30) Foreign Application Priority Data

Jun. 24, 2019 (GB) ...................................... 1908986

(51) Int. Cl.
*G06V 10/764* (2022.01)
*G06N 3/08* (2023.01)
(Continued)

(52) U.S. Cl.
CPC ............... *G06N 3/08* (2013.01); *B60W 40/09* (2013.01); *G06F 18/214* (2023.01); *G06F 18/24* (2023.01); *G06V 10/764* (2022.01); *G06V 20/597* (2022.01)

(58) Field of Classification Search
CPC .......... G06N 3/08; G06N 20/00; G06F 18/24; G06F 18/214; G06V 10/82; G06V 20/597; G06V 20/52; G06V 10/764; B60W 40/09
See application file for complete search history.

(56) References Cited

U.S. PATENT DOCUMENTS 8,996,234 B1 * 3/2015 Tamari ................ B60W 40/09
701/123
10,776,626 B1 * 9/2020 Lin ........................ G06N 3/048
(Continued)

FOREIGN PATENT DOCUMENTS

| CN | 105868690 A | 8/2016 |
| CN | 109685083 A | 4/2019 |
| WO | 2017177559 A1 | 10/2017 |

OTHER PUBLICATIONS

Eraqi, Hesham M., et al. "Driver distraction identification with an ensemble of convolutional neural networks." Journal of Advanced Transportation 2019 . (Year: 2019).*
(Continued)

*Primary Examiner* — Shaghayegh Azima
(74) *Attorney, Agent, or Firm* — Dorsey & Whitney LLP

(57) ABSTRACT

Determining that a motor vehicle driver is using a mobile device while driving a motor vehicle. Multiple images of a driver of a motor vehicle are captured through a side window of the motor vehicle. Positive images show a driver using a mobile device while driving a motor vehicle. Negative images show a driver not using a mobile device while driving a motor vehicle. Multiple training images are
(Continued)

selected from both the positive images and the negative images. The selected training images and respective labels, indicating that the selected training images are positive images or negative images, are input to a machine (e.g. Convolutional Neural Network, (CNN)). The CNN is trained to classify that a test image, captured through a side window of a motor vehicle, shows a driver using a mobile device while driving the motor vehicle.

20 Claims, 7 Drawing Sheets

(51) Int. Cl.
*B60W 40/09* (2012.01)
*G06V 20/59* (2022.01)
*G06F 18/24* (2023.01)
*G06F 18/214* (2023.01)

(56) References Cited

U.S. PATENT DOCUMENTS

| | | | | |
|---|---|---|---|---|
| 10,991,245 | B2* | 4/2021 | Olsen | G08G 1/096741 |
| 11,068,730 | B1* | 7/2021 | Chan | B60W 40/08 |
| 11,099,537 | B2* | 8/2021 | Spalt | G06F 17/18 |
| 11,138,478 | B2* | 10/2021 | Liu | G06F 18/217 |
| 11,527,083 | B2* | 12/2022 | Devor | G06F 18/214 |
| 2008/0069400 | A1* | 3/2008 | Zhu | G06V 10/255 |
| | | | | 382/103 |
| 2015/0055855 | A1* | 2/2015 | Rodriguez | G06V 10/774 |
| | | | | 382/155 |
| 2015/0286884 | A1* | 10/2015 | Xu | G06V 20/597 |
| | | | | 382/103 |
| 2015/0286885 | A1* | 10/2015 | Bulan | G06V 10/50 |
| | | | | 382/104 |
| 2016/0171682 | A1* | 6/2016 | Abedini | G16H 30/20 |
| | | | | 382/132 |
| 2019/0286940 | A1* | 9/2019 | Shen | G06T 11/60 |
| 2020/0342328 | A1* | 10/2020 | Revaud | G06F 18/22 |
| 2020/0401826 | A1* | 12/2020 | Devor | G06F 18/214 |
| 2020/0410214 | A1* | 12/2020 | Huang | G06V 40/168 |
| 2021/0043331 | A1* | 2/2021 | Ozcan | G06V 10/82 |
| 2021/0174149 | A1* | 6/2021 | Zhou | G06V 10/82 |
| 2021/0225511 | A1* | 7/2021 | Kiraly | G06N 3/08 |
| 2021/0316754 | A1* | 10/2021 | Bielby | B60W 10/18 |

OTHER PUBLICATIONS

Eraqi et al. "Driver Distraction Identification with an Ensemble of Convolutional Neural Networks"; Journal of advanced transportation. (Year: 2019).*
U.S. Appl. No. 16/907,245, Notice of Allowance, dated Aug. 17, 2022, 16 pages.
U.S. Appl. No. 16/907,245, Final Office Action, dated Feb. 24, 2022, 29 pages.
U.S. Appl. No. 16/907,245, Non-Final Office Action, dated Oct. 25, 2021, 27 pages.
1908986.1, United Kingdom Search Report, dated Dec. 10, 2019.
Eraqi, Hesham M., et al., "Driver Distraction Identification with an Ensemble of Convolutional Neural Networks", Hindawi, Journal of Advanced Transportation, Feb. 2019, 13 pages.

* cited by examiner

30 ically adds richness to the model by increasing the number of parameters and thresholds of the neurons, classifiers, and other components of the deep neural networks. Each layer can have a different type of connectivity. Individual layers can include convolutional weighting, non-linear transformation, response normalization, and/or spatial pooling.

TRAINING A MACHINE TO RECOGNIZE A MOTOR VEHICLE DRIVER USING A MOBILE DEVICE

BACKGROUND

1. Technical Field

Aspects of the present invention relate to training a machine learning algorithm for detection of traffic violations involving a motor vehicle driver using by a mobile device.

2. Description of Related Art

According to the World Health Organization (WHO), 1.35 million people die each year as a result of traffic accidents, costing countries 3% of their gross domestic product. Traffic accidents are the most common cause of death for children and young adults between the ages of 5 and 29. Leading causes of traffic accidents are speeding and distracted driving violations, especially by use of mobile electronic devices while driving. These violations present difficult challenges for law enforcement. While traffic police have tools for detecting speeding violations, there are few options available for detecting use of mobile devices while driving. A police officer may happen to personally witness mobile device usage while driving. Alternatively, motor vehicle drivers may be captured on video, and human operators may view the captured video and monitor for mobile device usage by drivers. However, these conventional methods, require considerable manpower and as a result relatively small fraction of mobile device usage violations by drivers are currently documented and enforced.

Thus there is a need for and it would be advantageous to have a method to train a machine to recognize a motor vehicle driver using a mobile device in captured images from a road environment.

Certain computer problems, such as character recognition and image recognition are known to be well-handled by machine-learning techniques. Chief among these is the use of neural networks. Neural networks are a class of algorithms based on a concept of inter-connected "neurons." In a typical neural network, neurons contain data values, each of which affects the value of a connected neuron according to connections with pre-defined strengths, and whether the sum connections to each particular neuron meets a pre-defined threshold. By determining proper connection strengths and threshold values (a process also referred to as "training"), a neural network can achieve efficient recognition of images and characters, for example. Often times, these neurons are grouped into "layers".

Deep neural networks have multiple layers, which adds richness to the model by increasing the number of parameters and thresholds of the neurons, classifiers, and other components of the deep neural networks. Each layer can have a different type of connectivity. Individual layers can include convolutional weighting, non-linear transformation, response normalization, and/or spatial pooling.

BRIEF SUMMARY

Various methods and systems are described herein for determining that a motor vehicle driver is using a mobile device while driving a motor vehicle. The system includes a camera, processor and memory. Multiple images of a driver of a motor vehicle are captured from the camera by the processor and stored in the memory. The images of a driver of a motor vehicle are captured through a window of the motor vehicle. Multiple positive images are selected from the captured images. The positive images show a driver using a mobile device while driving a motor vehicle. Multiple negative images are selected from the captured images. The negative images show a driver not using a mobile device while driving a motor vehicle. Multiple training images are selected from both the positive images and the negative images. The selected training images and respective labels indicating that the selected training images are positive images or negative images are input to a machine, (e.g. Convolutional Neural Network, (CNN)). The machine is trained to classify that a test image, captured through a window of a motor vehicle, shows a driver using a mobile device while driving the motor vehicle. A loss function associated with the training of the machine, may be previously defined. A value of the loss function is related to accuracy of classification of the positive training images. Responsive to a value of the loss function, the training of the machine may be optimized by adding a training image to the selected training images or by removing at least one of the selected training images to producing an adjusted set of selected training images. The training may be repeated using the adjusted set of selected training images. The optimization may further include minimizing the loss function by adjusting parameters of the loss function. A goal of the optimization may be to increase above a previously determined threshold a fraction of true positive classifications.

During the training, the machine may classify at least one of the training images as a positive image which shows a driver using a mobile device while driving a motor vehicle, to produce a positive classified image. The machine may mark an area on the positive classified image. The area may include an image feature used by the machine during the training to classify the positive classified image. The positive classified image and the machine marked area may be inspected. Responsive to the inspection, the training image may be removed from the selected training images when the area marked by the machine is not indicative of a driver using a mobile device while driving the motor vehicle. The trained machine may be tested by first inputting to the trained machine a positive test image captured through a window of a motor vehicle. The positive test image shows a driver using a mobile device while driving a motor vehicle. Responsive to the first inputting, a first score is output indicative of confidence of positive identification that the positive test image shows a driver using a mobile device while driving a motor vehicle. A feature may be masked of the positive test image to produce a masked positive test image with a masked feature. A second score may be output indicative of confidence of positive identification that the masked positive test image shows a driver using a mobile device while driving a motor vehicle. A comparison of the first and the second scores may indicate relevance of the masked feature to positive identification that the positive test image shows a driver using a mobile device while driving a motor vehicle.

The machine after training is configured to access multiple image frames captured in a road environment of drivers of respective moving motor vehicles. The machine after training is configured to classify above a previously determined threshold a fraction of true positive classifications of the drivers using a mobile device while driving. The machine after training may be configured for installation in a host motor vehicle. The machine after training may be configured for installation at a fixed site in the road environment. A filter classifier may be configured to access the image frames captured in the road environment and label the image frames as including at least a side view of a moving vehicle and a driver prior to classification by the machine after training.

Various sets of training images produced by the methods disclosed herein are included as embodiments of the present invention. The sets of training images are captured through a window of the motor vehicle. Multiple positive images are selected from the captured images. The positive images show a driver using a mobile device while driving a motor vehicle. Multiple negative images are selected from the captured images. The negative images show a driver not using a mobile device while driving a motor vehicle. Multiple training images are selected from both the positive images and the negative images. The selected training images and respective labels indicating that the selected training images are positive images or negative images are input to the machine, (e.g. Convolutional Neural Network, (CNN)). The machine is trained to classify that a test image, captured through a window of a motor vehicle, shows a driver using a mobile device while driving the motor vehicle.

These, additional, and/or other aspects and/or advantages of the present invention are set forth in the detailed description which follows; possibly inferable from the detailed description; and/or learnable by practice of the present invention.

BRIEF DESCRIPTION OF THE DRAWINGS

The invention is herein described, by way of example only, with reference to the accompanying drawings, wherein.

Figure 1:
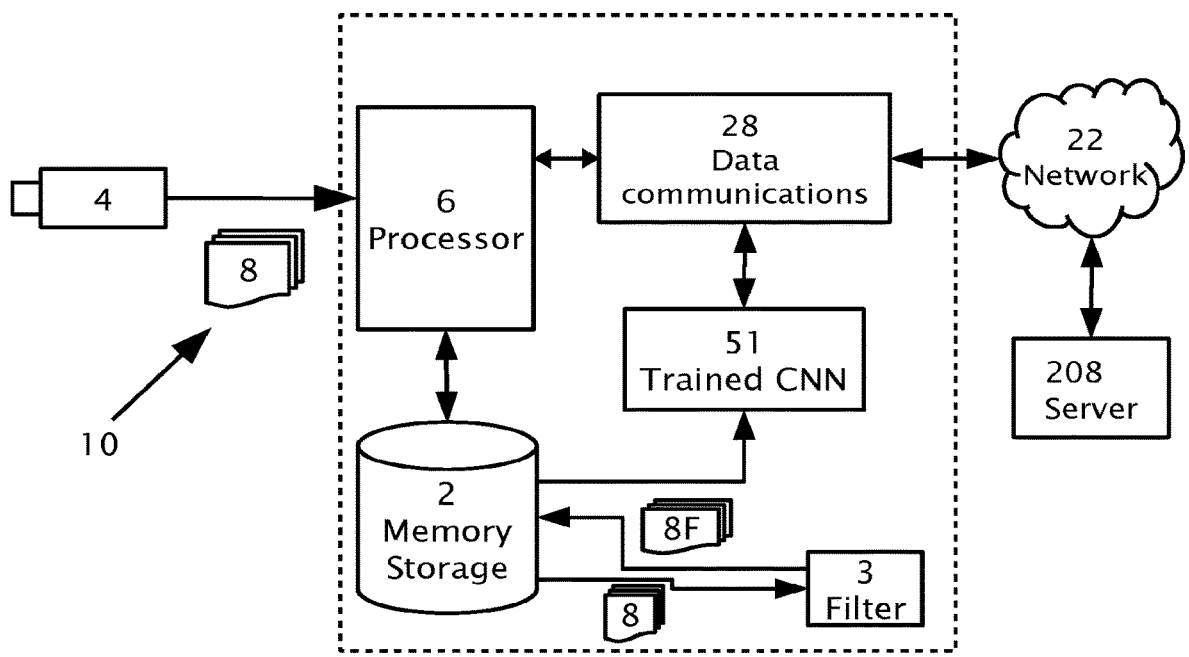
FIG. 1 illustrates a diagram of a system, according to features of the present invention.

The foregoing and/or other aspects will become apparent from the following detailed description when considered in conjunction with the accompanying drawing figures.

DETAILED DESCRIPTION

Reference will now be made in detail to features of the present invention, examples of which are illustrated in the accompanying drawings, wherein like reference numerals refer to the like elements throughout. The features are described below to explain the present invention by referring to the figures.

By way of introduction, various embodiments of the present invention are directed to training a machine learning algorithm, e.g. convolutional neural network (CNN), to identify frames of a video (or still images) including an image of a motor vehicle driver using or otherwise distracted by a cellular phone or other mobile device. Training images of motor vehicle drivers may be captured in a road environment from a fixed and/or mobile camera through a window, e.g. the window on the driver's side, from a distance ranging between 2-20 meters. A data set of training images are selected such that they either unambiguously depict a distracted driver and are labeled as positive training images; or unambiguously do not depict a distracted driver and are labeled as negative training images. The machine learning algorithm, e.g. CNN, may use a previously defined parameterized loss function which quantitatively measures success in distinguishing between the positive and the negative training images. The machine learning algorithm may internally optimize the parameters of the loss function, e.g. weights and biases to minimize the previously defined loss function. During the training cycle, as the machine learning algorithm improves and makes fewer errors, the value of the loss function decreases. Training may include an iterative process including multiple training cycles including analyzing, e.g. manually, an output produced by a machine learning algorithm, e.g. CNN, after a training cycle. The training image set may be adjusted, i.e. training images may be added or removed and/or the configuration, i.e. parameters of the machine learning algorithm may be changed to optimize the training. These changes intend to improve the training cycle, cause a more rapid convergence, i.e. fewer internal iterations per training cycle and/or reduce the final value of the loss function. The training process may be considered successful when the trained machine learning algorithm, e.g. CNN recognizes a fraction of true positive detections (compared with all (true and false) positive detections) greater than a previously determined threshold.

The machine learning algorithm as presented herein is generally known as a deep learning convolutional neural network, CNN. Many implementations may be considered, the details of which are fully and publicly disclosed. Some examples include:

fast region-based convolutional network method (Fast R-CNN) for object detection. (Girschick, Ross (2015). "Fast R-CNN". Proceedings of the IEEE International Conference on Computer Vision: pp. 1440-1448)

single shot multibox detector (Liu, Wei (October 2016). SSD: Single shot multibox detector. European Conference on Computer Vision. Lecture Notes in Computer Science. 9905. pp. 21-37)

you only look once (yolo) (Redmon, Joseph (2016). "You only look once: Unified, real-time object detection". 2016 IEEE Conference on Computer Vision and Pattern Recognition (CVPR), Volume: 1, pp. 779-788)

Retinanet (Lin, T. Y., Goyal, P., Girshick, R., He, K. and Dollar, P., 2017. Focal loss for dense object detection. In Proceedings of the IEEE international conference on computer vision (pp. 2980-2988).

Other deep learning algorithms may also be contemplated for use according to different embodiments of the present invention, such as support vector machines (SVMs) or a hybrid between neural networks and SVMs, by way of example.

Embodiments of the present invention may include one or more processors. Processors may include a central processing unit ("CPU"), a graphic processing unit ("GPU"), or other suitable information processing devices. Depending on the type of hardware being used, processors can include one or more printed circuit boards, and/or one or more microprocessor chips. In addition, the processors are configured to carry out the computer program instructions stored in a memory so as to implement processes as disclosed herein. An example of a graphic processing unit (GPU) which is a suitable platform for deep learning is Geforce™ RTX 2070 of Nvidia Corporation (Santa Clara, CA, USA).

Figure 2:
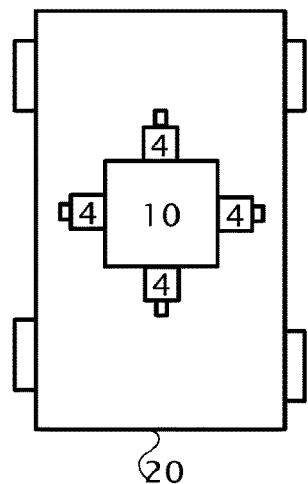
FIG. 2 illustrates schematically the system installed on a host vehicle, according to features of the present invention.
Figure 3:
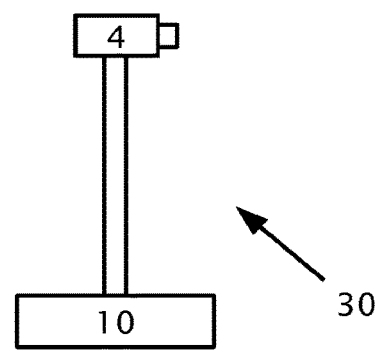
FIG. 3 illustrates an alternative embodiment of the system of FIG. 1 including a fixed camera, according to features of the present invention.
Figure 4:
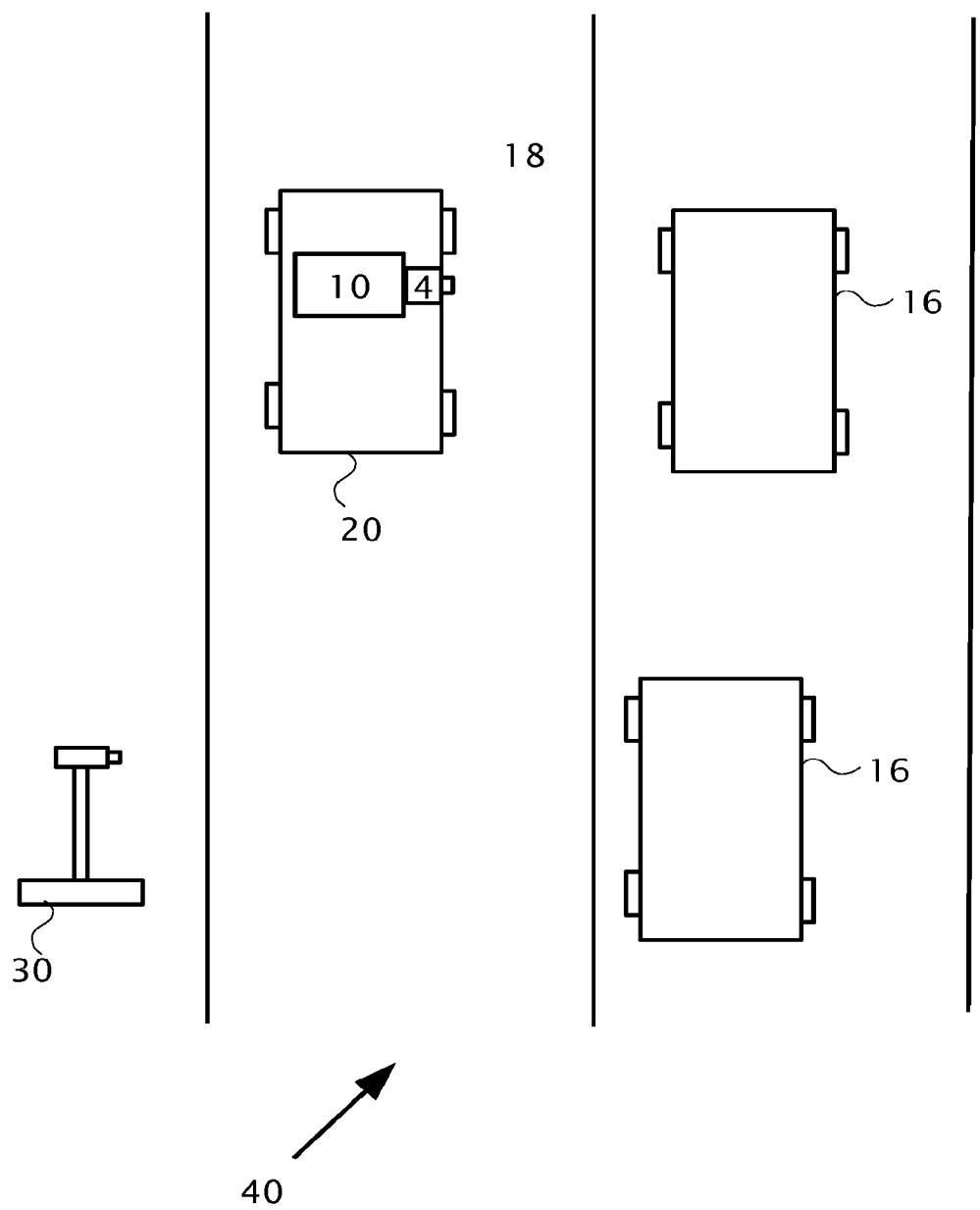
FIG. 4 illustrates schematically deployment of the system of FIG. 1 in a road environment, according to features of the present invention.

Referring now to the drawings, reference is now made to FIG. 1 which shows a diagram of a system 10, according to an embodiment of the present invention. System 10 includes a processor 6 which is configured to capture image frames 8 from a camera 4 and store captured image frames 8 in memory 2. Image frames 8 may be accessed from memory 2 by trained machine 51, e.g. convolutional neural network (CNN), and are classified as showing a driver using a mobile device while driving, according to a feature of the present invention. Classified image frames may be locally stored in memory 2, or uploaded through a data communications interface 28 to a network 22, a wide area network or a local area network. System 10 may be remotely configured from a server 208 through network 22 to data communications interface 28. In an alternative embodiment of the present invention, trained CNN 51 may be installed remotely, connected to network 22. Image frames 8 may be uploaded or video may be streamed to a remote storage location (not shown) and classification may be performed remotely. According to a feature of the present invention an image filter 3 may be used to input image frames 8 and classify images frames 8 as having previously defined image features including a side view of a moving vehicle and a driver. The output of image filter 3 may be stored images or labeled images 8F. Trained CNN 51 may be configured to access or receive as input filtered images 8F. Use of filter 3 is intended to eliminate or reduce extraneous images from being input to trained CNN 51 which do not feature a side view of a vehicle or do not feature a driver. Reference is now also made to FIG. 2 which illustrates schematically system 10 and camera 4 installed on a host vehicle 20. In the example shown in FIG. 2, four cameras 4 are shown installed on host vehicle 20, each camera 4 facing a different direction. Host vehicle 20 may be a law enforcement vehicle or an undercover law enforcement vehicle. Reference is now also made to FIG. 3 which illustrates an alternative embodiment 30 of system 10 including a fixed camera 4 connected to system 10. Reference is now also made to FIG. 4 which illustrates schematically deployment of system 10 in a road environment. Host vehicle 20 with system 10 installed may be used to capture image frames 8 of a driver of motor vehicle 16 through a window of the motor vehicle, for instance through a window adjacent to the driver of motor vehicle 16, through the front passenger window of motor vehicle 16 or through the windshield. System 30 equipped with fixed camera 4 may be similarly utilized to capture image frames 8 through a window of motor vehicle 16.

Figure 5A:
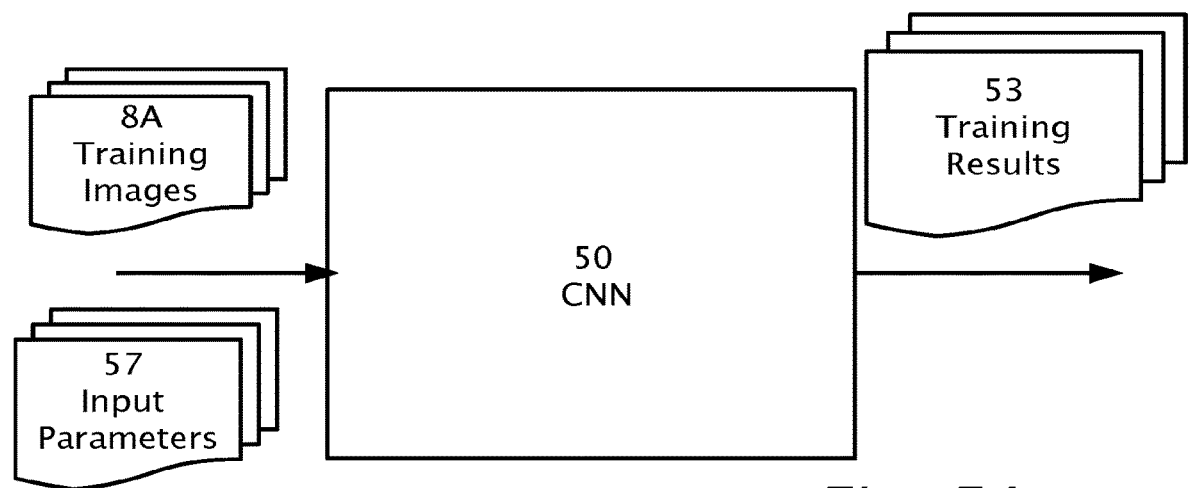
FIG. 5A illustrates a training module in which training images are used to train a machine learning algorithm, e.g. CNN, running on a hardware platform, according to features of the present invention.
Figure 8:
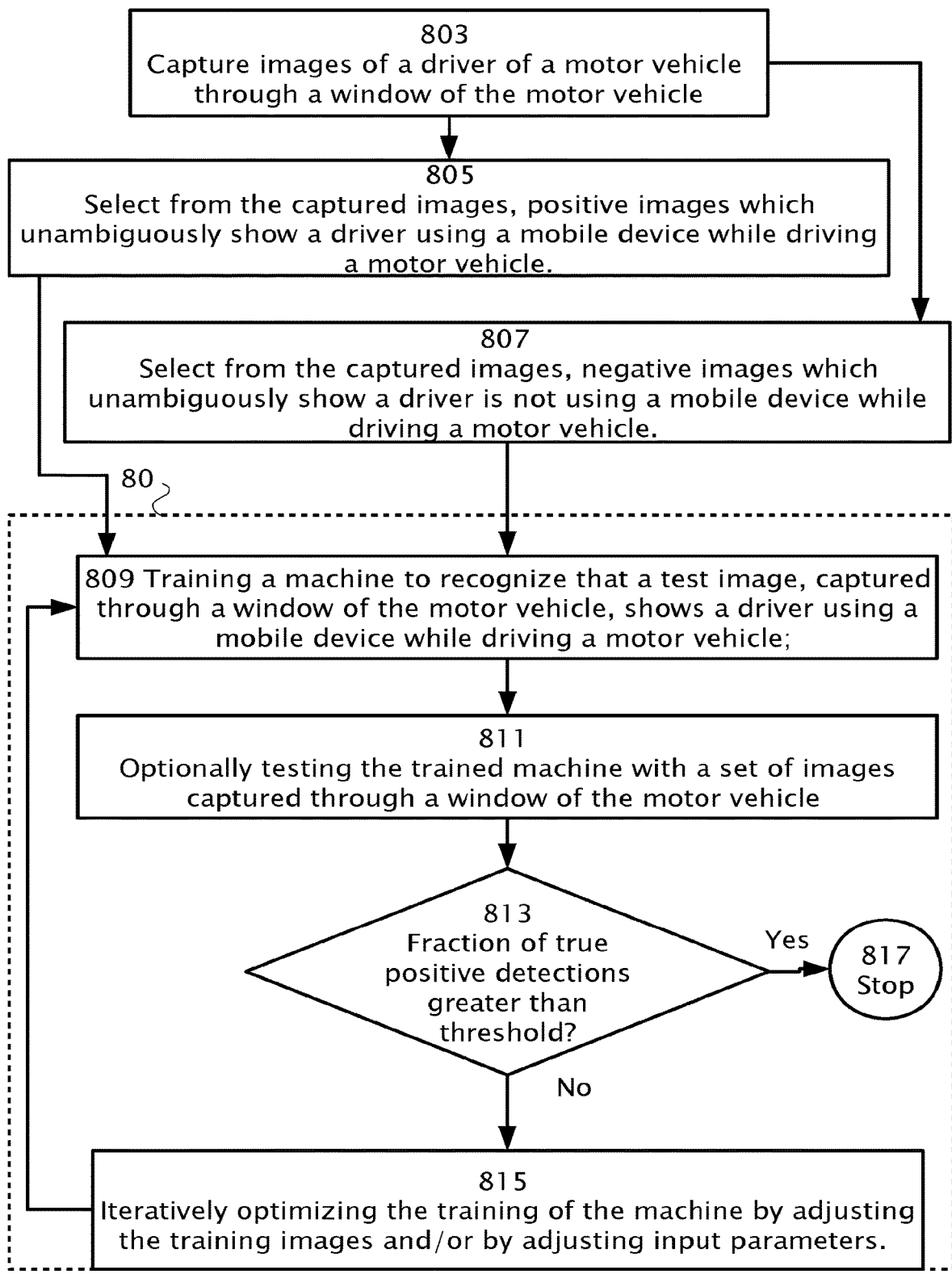
FIG. 8 illustrates a method according to features of the present invention.

Reference is now also made to FIG. 5A, which illustrates a training module 50 in which training images 8A are used to train machine learning algorithm, e.g. CNN 50 running on a suitable hardware platform, e.g. a graphics processing unit (GPU). Reference is now also made to FIG. 8, which illustrates a method according to features of the present invention. Training images 8A of motor vehicle 16 are captured (step 803) traveling along a road from a fixed and/or mobile camera 4 through a window of vehicle 16, from a distance ranging between 2-20 meters. From the captured images, training images 8A are selected (steps 805, 807) such that selected training images 8A either unambiguously depict a distracted driver, i.e. a driver using a mobile device while driving, and are labeled as positive training images; or unambiguously do not depict a distracted driver and are labeled as negative training images. Selected training images 8A and respective labels, i.e. positive or negative images, are used to train machine learning algorithm, e.g. CNN 50 during training cycle (step 809). Various input parameters 57 are used to configure machine learning algorithm, e.g. CNN 50. At the end of a training cycle (step 809), training results 53 are output from machine learning algorithm, e.g. CNN 50. Training results 53 may include: a series of scores that the loss function achieved over the training cycle (step 809). Training cycle (step 809) results 53 may be analyzed according to criteria such as: the best or lowest score that the loss function achieved during training cycle (step 809), the final score that the loss function achieved at the end of training cycle (step 809) and/or the rate of convergence of the loss function to reach the best or minimum value.

Figure 6:
FIGS. 6 and 6A illustrate examples of positive images captured in a road environment of a driver of a motor vehicle using a mobile device or otherwise distracted by a mobile device while driving, according to features of the present invention.
Figure 6A:

Reference is now also made to FIGS. 6 and 6A which illustrate positive images captured in a road environment of a driver of a motor vehicle using a mobile device or otherwise distracted by a mobile device while driving. FIG. 6 shows a driver looking downward rather than straight ahead through the forward windshield. A mobile electronic device can be discerned near the lap of the driver near the bottom center of the captured image.

In FIG. 6A another driver is shown holding a mobile device with his left hand to his right ear while appearing to be looking through the driver's window.

Figure 7:
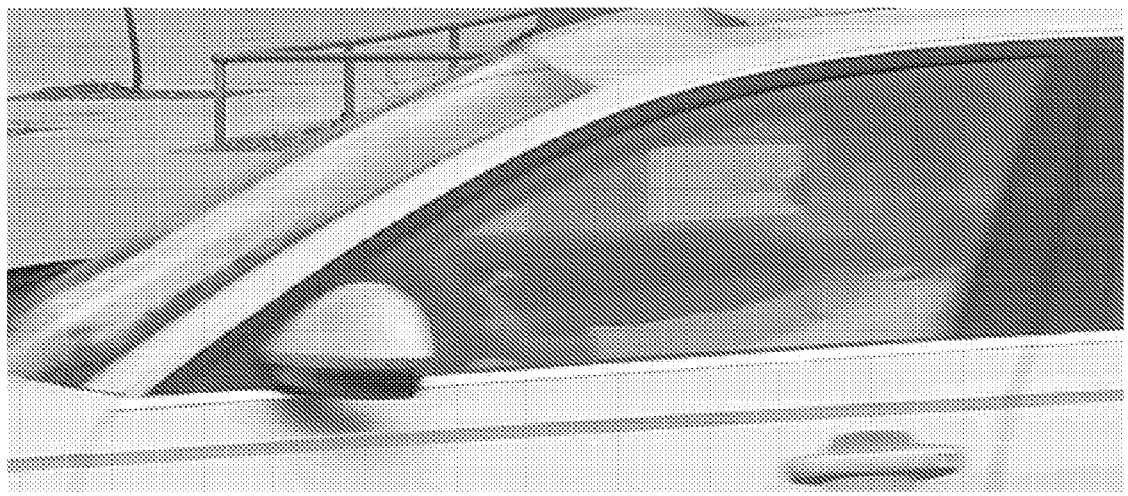
FIGS. 7 and 7A illustrate negative images captured in a road environment of a driver of a motor vehicle not using a mobile device nor distracted by a mobile device while driving, according to features of the present invention.
Figure 7A:

In comparison, FIGS. 7 and 7A illustrate negative images captured in a road environment of a driver of a motor vehicle not using a mobile device nor distracted by a mobile device while driving. In both cases shown in FIGS. 7 and 7A, the profile of the driver is clearly discerned relative to the vehicle window frame. The drivers appear to be undistracted, looking ahead through the front windshield. One or two hands can be discerned on the steering wheel.

Figure 5B:
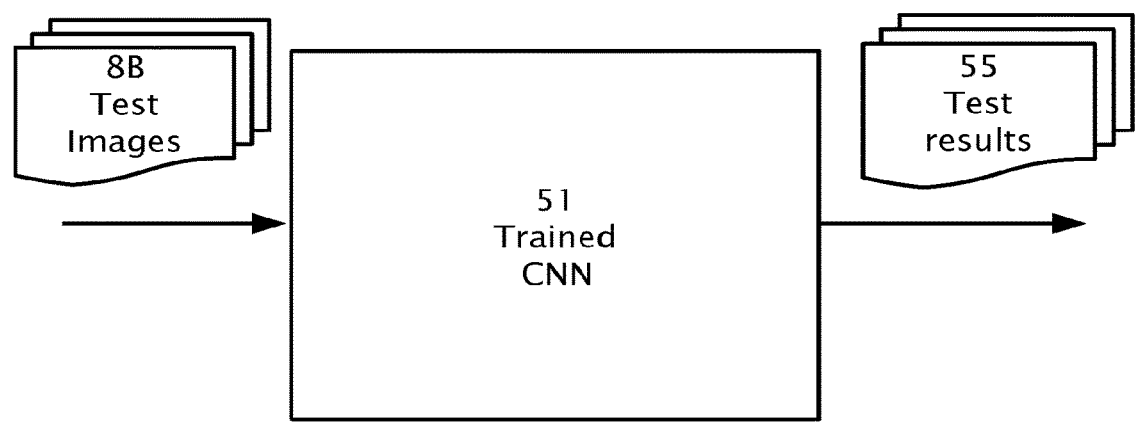
FIG. 5B illustrates a trained machine learning algorithm, e.g. trained CNN, according to features of the present invention.

While still referring to FIG. 8, reference is now also made to FIG. 5B which illustrates testing (step 811) a trained machine learning algorithm, e.g. trained CNN 51.

Test images 8B are captured using camera 4 and system 10 in a road environment of multiple drivers of respective vehicles 16. Test images 8B may be input (step 811) to a trained CNN 51 and test results 55 may be output. Test results 55 may include for test images 8B respective scores which indicate confidence levels (i.e. number between zero and one or a corresponding percent) a score that test image 8B was captured while a driver is using a mobile device or otherwise distracted by a mobile device; and a score that test image 8B was captured while a driver is not using a mobile device while driving.

Referring still to FIG. 8, in step 813, test images 8B and respective scores 55 may be reviewed, e.g. manually. A reference score may be chosen representing a minimum confidence level, e.g. 95% that captured in a test image 8B is a driver clearly shown using a mobile device while driving. The minimum confidence level may be chosen to ensure that the fraction of true positive detections compared to (divided by) all (true and false) positive detections is greater than a previously determined threshold, e.g. 99%. Under this condition, if there are at least some true positive detections then training process 80 of CNN 51 may be sufficiently accurate and training process 80 may be stopped (step 817). Otherwise, if there are insufficient true positive detections and/or too many false positive detections, then training process 80 may continue with step 815 by iteratively optimizing the training by adjusting training images (adding or removing training images) and/or by adjusting input configuration parameters 57.

Training process 80 then feeds back to training cycle (step 809).

Training Results 53 Produced by Training Cycle (Step 809)

Training cycle (step 809) produces training results 53. Training results 53 are metrics provided by the machine learning algorithm, e.g. CNN during training which may be used to evaluate success or accuracy in distinguishing between positive training images 8A showing drivers using a mobile device and negative training images 8A not showing drivers using a mobile device.

Training results may include 53:
1. the best score that the loss function achieves during training step 809 and/or the final score that the loss function achieves at the end of training step 809
2. an overall contour of a learning curve during training step 809
3. a location of an inferred area of interest 1. The Best Score and/or Final Scores that the Loss Function Achieves The best and/or final scores obtained by the loss function provide a baseline by which results 53 of training cycle (step 809) may be compared with other training cycles (step 809). The best and/or final scores obtained by the loss function are useful to determine overall success of the adjustments (step 815) that are made to training images 8A and/or to input configuration parameters 57 of training cycle (step 809) during the previous iteration of training process 80. When adjustments (step 815) to input parameters 57 and/or selection of training images 8A leads to significantly lower score of the loss function, adjustments (step 815) made during training process 80, are likely in the right "direction". Conversely, when there is a significant increase in score of the loss function, this may be an indication that input parameters 57 and/or selection of training images 8A should be restored to those of a previous training cycle (step 809).

2. Contour of the Learning Curve

During a training (step 809), machine learning algorithm, e.g. CNN 50 improves classification through internal iterations. However, the rate of improvement diminishes as CNN 50 approaches optimal weights and biases as parameters of the loss function. After a certain time interval, continuing training (step 809) is not effective in terms of time and computing resources. Machine learning algorithm, e.g. CNN 50 may be configured to halt training cycle (step 809) upon reaching a point of diminishing improvement, thus increasing the efficiency of training process 80 in terms of time and computer resources. This may be achieved by determining a number of internal iterations generally required to reach a plateau in training (step 809), or by configuring CNN 50 to stop a training cycle (step 809) when a previously defined plateau of improvement is reached.

Contour of the learning curve may also provide information with respect to adjustment (step 815) of the machine learning configuration input parameters 57. For example, if the learning curve appears to be taking an inordinately long time to reach a plateau, a perturbation step size (input parameters 57) may be adjusted (step 815) to increase the speed of training cycle (step 809) in a subsequent iteration.

The contour of the learning curve may inform with respect to the number of training images 8A that are input into CNN 50. Generally, processing time required to execute training cycle (step 809) is proportional to the number of training images 8A times the number of internal iterations within training cycle (step 809). Increasing the number of training images 8A generally decreases the number of internal iterations. As a result, the contour of learning curves generated by training image 8A sets of different sizes, may inform whether computer system resources are better invested with an adjustment to the training image 8A set or by configuring a change to the number of internal iterations.

3. Location of an Inferred Area of Interest

When CNN 50 positively identifies a training mage 8A, CNN 50 may mark an area on training image 8A to indicate a portion of training image 8A which purports to show a distracted driver using a mobile device. An error in the marked area of interest by CNN 51, i.e. CNN 51 marked an area where there is clearly no driver, indicates that the adjustment (step 815) of the present training cycle may be detrimental and a restoration to a previous iteration of training cycle (step 809) is recommended.

Training images 8A may be marked, e.g. manually, with an area of interest including an image of a driver using a mobile device. If the same images 8A are also used as test images 8B then the marking of CNN 50 may be compared with the marking of the corresponding training images 8A to determine if the training is successful for the training/testing images 8A/8B compared.

Test Results 53

Unseen Images

Test results 53 including the weights and biases, i.e. loss function parameters, that were obtained from training process 80 may be assessed using an unambiguous set of images, not previously used during training process 80. Ideally, CNN 51,50 should show little or no change in the loss function between training image set 8A and an unseen test image 8b image set. If the CNN 50 performs significantly better in training set 8A than CNN 51 performs test image set 8B, then overfitting is indicated. If overfitting is suspected, there are several possible actions which may be performed to reduce overfitting:

Swapping out a subset of images in training images 8A with different training images to increase diversity.
Increasing the number of images in training set 8A to ensure greater diversity
Changing the size of the labeled area of interest in the images in the training set
Reducing the number of internal iterations in training cycle (step 809)
Changing the training configuration Ambiguous Images Ambiguous images are those for which humans may be unable to label with certainty whether a driver distracted by a mobile device is shown or not shown in the image. Testing (step 811) the trained CNN 51 on ambiguous images 8A provides subjective information about the boundaries that trained CNN 51 uses for identifying distracted drivers.

Training results 53 from use of ambiguous images may be of use when weighing potential adjustments (step 815) to training image set 8A.

Ambiguous test images 8B may be in the following primary categories:

Group 1: Test images 8B that depict a difficult-to-see distracted driver, which may cause trained CNN 51 to issue a false negative detection.

Group 2: Test images 8B which apparently do not show a distracted driver but that nevertheless contain other elements that may cause trained CNN 51 to issue a false positive detection.

Group 3: Test images 8B for which there is uncertainty on the part of human programmers ("null images").

If trained CNN 51 incorrectly identifies most of test images 8B in groups 1 and 2, this may provide evidence that training image set 8A requires adjustment (step 815). If trained CNN 51 correctly identifies most of images in groups 1 and 2, this may be an indication that trained CNN 51 is functioning sufficiently well. While trained CNN 51 is not expected to identify all test images 8B in these groups, there is always the hope that the system may perform beyond expectations because even humans might have difficulty correctly identifying some of these ambiguous test images 8B.

While test images 51 in group 3 are not directly used to influence the parameters, they provide a certain glimpse into the inner workings of trained CNN 51 by operational operation information with respect to image features that trained CNN 51 uses to recognize a distracted driver.

Masking Test

CNNs 50 have been known to latch onto irrelevant details, often because training/testing images 8A/8B may have an unnoticed common feature not relevant to the features of interest. A masking test may be used to detect, isolate, and eliminate this issue.

The masking test involves rerunning an identification process (step 811) many times over a positively-identified test image 8B. In each of these runs, a different image portion of the original image may be removed by a filter which masks the details in that image portion, e.g. replacing the image portion an with an average color.

The purpose of the masking test is to quantify relative importance of individual image details of the original image to the original positive identification. If CNN 51 identification confidence drops significantly when a given portion of the image is masked, then the masked image portion contributes significantly to the positive decision. Conversely, if the identification confidence does not change significantly by masking, then the masked image portion appears irrelevant to the positive decision.

By running the masking test, there is an indication of whether trained CNN 51 bases a decision on image features relevant to a distracted driver. Relevant features may include, position of body parts, particularly facial profile relative to side and front windows of vehicle 16 and/or position of hands relative to the steering wheel. However, if masking test results indicate that trained CNN 51 bases a positive decision on details known as irrelevant such as a background traffic light, then training image 8A set may be insufficiently diverse, e.g. too many of the positive examples in the training set may happen to have a similar traffic light in the background.

Figure 9:
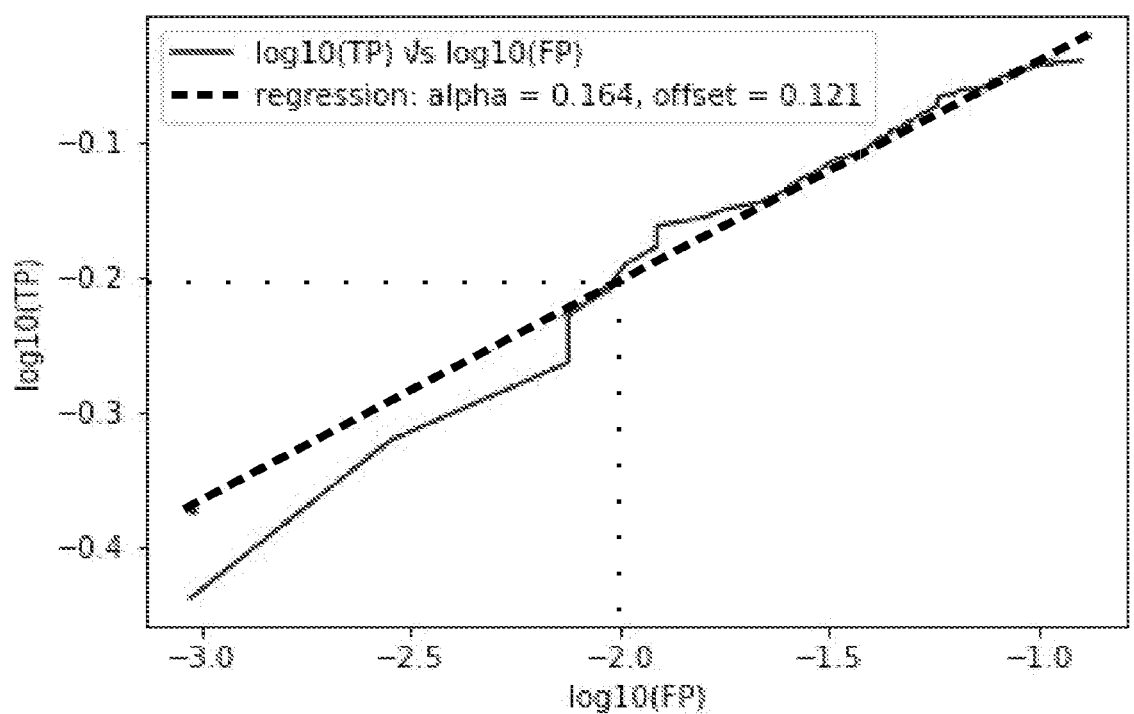
FIG. 9 includes a graph true positive detections against false positive detections for a convolutional neural network machine trained to detect images of a driver using a mobile device while driving, according to features of the present invention.

Reference is now made to FIG. 9 which includes a graph of logarithm (base 10) true positive detections (ordinate) against logarithm (base 10) false positive detections (abscissa) for a convolutional neural network machine 51 trained to detect images of a driver using a mobile device while driving, according to embodiments of the present invention. In the upper-right quadrant, all the true positive images are correctly classified, however with a trade off by relatively large 10% false positives. In the lower left quadrant, about 30% of the true positive images are correctly classified and with only 0.1% false positive detections. A linear regression of the graph is shown. The slope of the regressed line is a figure of merit for the overall performance of trained CNN 51, the higher the slope the better is the performance. Dotted lines show intercept points near the center of the graph where false-positive acceptance is about 1% and true-positive classifications are about 60%. In other words, with minimal human supervision to filter out a ~1% false positive acceptance rate, about 60% of the traffic offenders may be prosecuted.

Performance of the system, according to embodiments of the present invention, appears to be more than sufficient for law enforcement agencies to use for effectively enforcing traffic laws with respect to use of mobile devices while driving.

The embodiments of the present invention may comprise a general-purpose or special-purpose computer system including various computer hardware components, which are discussed in greater detail below. Embodiments within the scope of the present invention also include computer-readable media for carrying or having computer-executable instructions, computer-readable instructions, or data structures stored thereon. Such computer-readable media may be any available media, transitory and/or non-transitory which is accessible by a general-purpose or special-purpose computer system. By way of example, and not limitation, such computer-readable media can comprise physical storage media such as RAM, ROM, EPROM, flash disk, CD-ROM or other optical disk storage, magnetic disk storage or other magnetic storage devices, or any other media which can be used to carry or store desired program code means in the form of computer-executable instructions, computer-readable instructions, or data structures and which may be accessed by a general-purpose or special-purpose computer system.

In this description and in the following claims, a "computer" or "computer system" is defined as one or more software modules, one or more hardware modules, or combinations thereof, which work together to perform operations on electronic data. For example, the definition of computer system includes the hardware components of a personal computer, as well as software modules, such as the operating system of the personal computer. The physical layout of the modules is not important. A computer system may include one or more computers coupled via a computer network. Likewise, a computer system may include a single physical device (such as a smartphone, Personal Digital Assistant "PDA" and/or tablet) where internal modules (such as a memory and processor) work together to perform operations on electronic data. While any computer system may be mobile, the term "mobile computer system" especially includes laptop computers, net-book computers, tablets, cellular telephones, smart-phones, wireless telephones, personal digital assistants, portable computers with touch sensitive screens and the like.

The terms "mobile device", "mobile electronic device" and "mobile computer system" are used herein interchangeably and refers to an electronic device being used by a driver of a motor vehicle while driving in a road environment in such as way as to be distracted from driving.

Such use is generally prohibited by local traffic codes.

The term "accuracy" as used herein refers to a number of images that are correctly classified divided by a number of images tested.

The term "unambiguously" as used herein refers to positively or negative labeling, e.g. by a human operator, where a test image shows either a driver clearly distracted by a mobile device while driving or clearly not distracted by a mobile device while driving.

The term "loss function" as used herein is a parameterized function associated with a training cycle of a machine-learning algorithm; the loss function is minimized during the course of the training cycle. Accordingly, a loss function may be minimized or decreased, for example, to a pre-defined threshold to achieve a desired outcome for an optimization problem.

The term "inversely related" as used herein refers to the value of a loss function which normally decreases as the accuracy of classification increases.

The term "true positive detection" as used herein refers to a correct identification by a machine-learning algorithm of an image labeled as showing a driver using or otherwise distracted by a mobile device while driving.

The term "false positive detection" as used herein refers to a incorrect identification by a machine-learning algorithm as showing a driver using or otherwise distracted by a mobile device while driving while the image is labeled as not showing a driver using and not distracted by a mobile device while driving.

The term "true negative detection" as used herein refers to a correct identification by a machine-learning algorithm of an image labeled as showing a driver not using and not distracted by a mobile device while driving.

The term "false negative detection" as used herein refers to a incorrect identification by a machine-learning algorithm as not showing a driver using or otherwise distracted by a mobile device while driving while the image is labeled as showing a driver using and/or distracted by a mobile device while driving.

The term "compared with" as used herein means "divided by". A number of true positive detections compared with the total number of true positive plus false positive detections means the ratio of true positive detections divided by the sum of true positive and false positive detections. The term "fraction of true positive classifications" as used herein is similarly true positive classifications divided by the sum of true positive and false positive classifications. The terms "classification", detection" and "identification" are used herein interchangeably and refer to the classifying an image as either a positive image showing a distracted driver or a negative image showing an undistracted driver.

The term "through a window" as used herein in the context of capturing an image through a window refers to any window of the vehicle the driver being imaged is driving, typically a side window on the driver's side or passengers side, the side window may be open, closed or partially open and in some embodiments through a front and/or a back windshield.

The indefinite articles "a", "an" is used herein, such as "a mobile device", "a machine" have the meaning of "one or more" that is "one or more mobile devices" or "one or more machines".

All optional and preferred features and modifications of the described embodiments and dependent claims are usable in all aspects of the invention taught herein. Furthermore, the individual features of the dependent claims, as well as all optional and preferred features and modifications of the described embodiments are combinable and interchangeable with one another.

Although selected features of the present invention have been shown and described, it is to be understood the present invention is not limited to the described features.

The invention claimed is:

1. A method comprising: capturing a plurality of images of drivers of motor vehicles through windows of the motor vehicles; selecting from the captured images, a plurality of positive images which show the drivers exhibiting a behavior within the motor vehicles that constitutes a traffic violation; selecting from the captured images, a plurality of negative images which show the drivers not exhibiting the behavior while driving the motor vehicles; selecting a plurality of training images from both the positive images and the negative images; inputting to a machine the selected training images and respective labels indicating that the selected training images are positive images or negative images to train the machine to classify that images, captured through the windows of the motor vehicles, show the drivers exhibiting the behavior while driving the motor vehicle; testing the trained machine by first inputting to the trained machine a positive test image captured through a window of a motor vehicle, wherein the positive test image shows a driver exhibiting the behavior while driving the motor vehicle; responsive to the first inputting, first outputting a first score indicative of confidence of positive identification that the positive test image shows the driver exhibiting the behavior while driving the motor vehicle; masking a feature of the positive test image, thereby producing a masked positive test image with a masked feature; and second outputting a second score indicative of confidence of positive identification that the masked positive test image shows the driver exhibiting the behavior while driving the motor vehicle; wherein a comparison of the first and the second scores indicates relevance of the masked feature to positive identification that the positive test image shows a driver exhibiting the behavior while driving the motor vehicle.

2. The method of claim 1, wherein the machine is trained to identify images where the driver is distracted while driving the motor vehicle.

3. The method of claim 1, wherein the machine is trained to identify images where the driver is using a mobile device while driving the motor vehicle.

4. The method of claim 1, further comprising using a filter classifier to classify that an image includes a side view of a moving vehicle and a driver prior to classification by the trained machine.

5. The method of claim 1, further comprising: previously defining a loss function associated with the training of the machine, wherein a value of the loss function is related to accuracy of classification of the positive training images; and responsive to a value of the loss function, optimizing the training of the machine by adding a training image to the selected training images or by removing at least one of the selected training images, producing thereby an adjusted set of selected training images, and repeating the training using the adjusted set of selected training images.

6. The method of claim 5, wherein the optimizing further includes minimizing the loss function by adjusting parameters of the loss function, wherein a goal of the optimizing is to increase above a previously determined threshold a fraction of true positive classifications.

7. The method of claim 6, further comprising: during the training, classifying by the machine at least one of the training images as a positive image which shows the driver exhibiting the behavior while driving the motor vehicle, thereby producing a positive classified image; marking by the machine an area on the positive classified image, the area including an image feature used by the machine during the training to classify the positive classified image; and inspecting the positive classified image and the machine marked area; and responsive to the inspecting, removing said at least one training image from the selected training images when the area marked by the machine is not indicative of the driver exhibiting the behavior while driving the motor vehicle.

8. An apparatus comprising: a processor; and a memory storing instructions that, when executed by the processor, configure the apparatus to: receive a plurality of images of drivers of motor vehicles through windows of the motor vehicles while the drivers are driving the motor vehicles in a road environment; receive a selection of a plurality of positive images identified from the plurality of images, wherein the positive images show the drivers exhibiting a behavior within the motor vehicles that constitutes a traffic violation while driving the motor vehicles; receive a selection of a plurality of negative images identified from the plurality of images, wherein the negative images show drivers not exhibiting the behavior while driving the motor vehicles; select a plurality of training images from both the positive images and the negative images, wherein the apparatus is trained using the selected training images to recognize that a test image shows a driver using a mobile device while driving a motor vehicle; classify during training at least one of the training images as a positive image to produce a positive classified image which shows a driver exhibiting the behavior while driving a motor vehicle; mark an area on the positive classified image, wherein the area includes an image feature used by the apparatus during training to classify the positive classified image; wherein the positive classified image and the marked area are inspected; and wherein said at least one training image is removed from the selected training images when the area marked by the apparatus is not indicative of a driver exhibiting the behavior while driving the motor vehicle.

9. The apparatus of claim 8, wherein a loss function is previously defined associated with training of the apparatus, wherein a value of the loss function is related to accuracy of classification of the positive training images; wherein, responsive to a value of the loss function, training of the apparatus is optimized by adding a training image to the selected training images or by removing at least one of the selected training images to produce an adjusted set of selected training images, and wherein training is repeated using the adjusted set of selected training images.

10. The apparatus of claim 8, wherein the loss function is minimized by adjusting parameters of the loss function, wherein training of the apparatus is optimized to achieve a goal to increase above a previously determined threshold a fraction of true positive classifications.

11. The apparatus of claim 8, further comprising: wherein the trained apparatus is tested by inputting to the trained apparatus a positive test image captured through a window of a motor vehicle, wherein the positive test image shows a driver exhibiting the behavior while driving a motor vehicle; wherein a first score is output indicative of confidence of positive identification that the positive test image shows the driver exhibiting the behavior while driving the motor vehicle; wherein a feature of the positive test image is masked to produce a masked positive test image with a masked feature; wherein a second score is output indicative of confidence of positive identification that the masked positive test image shows the driver exhibiting the behavior while driving the motor vehicle; and wherein a comparison of the first and the second scores indicates relevance of the masked feature to a positive identification that the positive test image shows the driver exhibiting the behavior while driving the motor vehicle.

12. The apparatus of claim 8, further configured to access a plurality of image frames captured in a road environment of a plurality of drivers of respective plurality of moving motor vehicles and classify above a previously determined threshold a fraction of true positive classifications of the drivers exhibiting the behavior while driving.

13. The apparatus of claim 8, wherein the apparatus is configured for installation in a host motor vehicle.

14. The apparatus of claim 8, wherein the apparatus configured for installation at a fixed site in the road environment.

15. The apparatus of claim 8, further comprising: a filter classifier configured to access the image frames captured in the road environment and label the image frames as including at least a side view of a moving vehicle and a driver prior to classification by the apparatus.

16. A method comprising: capturing a plurality of images of drivers of motor vehicles through windows of the motor vehicles; selecting from the captured images, a plurality of positive images which show drivers exhibiting a behavior within the motor vehicles that constitutes a traffic violation while driving a motor vehicle; selecting from the captured images, a plurality of negative images which show drivers not exhibiting the behavior while driving a motor vehicle; selecting a plurality of training images from both the positive images and the negative images; by inputting the selected training images and respective labels indicating that the selected training images are positive images or negative images, training a machine to identify that a test image shows a driver exhibiting the behavior while driving the motor vehicle; and optimizing the training of the machine by adding or removing a portion of the training images to produce an adjusted set of training images and repeating the training using the adjusted set of training images; during the training, classifying by the machine at least one of the training images as a positive image which shows a driver exhibiting the behavior while driving a motor vehicle, thereby producing a positive classified image; marking by the machine an area on the positive classified image, the area including an image feature used by the machine during the training to classify the positive classified image; and inspecting the positive classified image and the machine marked area; and responsive to the inspecting, removing said at least one training image from the selected training images when the area marked by the machine is not indicative of the driver exhibiting the behavior while driving the motor vehicle.

17. The method of claim 16, the process further comprising: previously defining a loss function associated with the training of the machine, wherein a value of the loss function is inversely related to accuracy of classification of the positive training images; and optimizing the training of the machine responsive to a value of the loss function by minimizing the value of the loss function by adjusting parameters of the loss function.

18. The method of claim 16, the process further comprising: testing the trained machine by first inputting to the trained machine a positive test image captured through a window of a motor vehicle, wherein the positive test image shows the driver exhibiting the behavior while driving the motor vehicle; responsive to the first inputting, first outputting a score indicative of confidence of positive identification that the positive test image shows the driver exhibiting the behavior while driving the motor vehicle; and masking a feature of the positive test image, thereby producing a masked positive test image with a masked feature; second outputting a second score indicative of confidence of positive identification that the masked positive test image shows the exhibiting the behavior while driving the motor vehicle; and wherein a comparison of first and second scores indicates relevance of the masked feature to a positive identification that the positive test image shows the driver exhibiting the behavior while driving a motor vehicle.

19. The method of claim 16, wherein the machine is trained to identify images where the driver is distracted while driving the motor vehicle.

20. The method of claim 16, wherein the machine is trained to identify images where the driver is using a mobile device while driving the motor vehicle.

\* \* \* \* \*